United States Patent
Hui et al.

(10) Patent No.: US 9,169,731 B2
(45) Date of Patent: Oct. 27, 2015

(54) AIRFOIL COVER SYSTEM

(75) Inventors: Kwan Hui, Manchester, CT (US); Michael A. Weisse, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 806 days.

(21) Appl. No.: 13/488,556

(22) Filed: Jun. 5, 2012

(65) Prior Publication Data

US 2013/0319010 A1    Dec. 5, 2013

(51) Int. Cl.
*F01D 5/14* (2006.01)
*B23P 15/04* (2006.01)

(52) U.S. Cl.
CPC .............. *F01D 5/141* (2013.01); *B23P 15/04* (2013.01); *Y02T 50/672* (2013.01); *Y02T 50/673* (2013.01); *Y10T 29/49236* (2015.01)

(58) Field of Classification Search
CPC ........... F01D 5/141; F01D 5/147; F01D 5/18; F01D 5/16; F01D 5/26; F01D 5/282
See application file for complete search history.

(56) References Cited

U.S. PATENT DOCUMENTS

| | | |
|---|---|---|
| 2,786,538 A | 3/1957 | Blackburn et al. |
| 3,762,835 A | 10/1973 | Carlson et al. |
| 4,086,378 A | 4/1978 | Kam et al. |
| 4,091,146 A | 5/1978 | Darrow et al. |
| 4,789,304 A | 12/1988 | Gustafson et al. |
| 4,971,521 A | 11/1990 | Atarashi et al. |
| 4,973,521 A | 11/1990 | Graff et al. |
| 5,346,367 A | 9/1994 | Doolin et al. |
| 5,674,050 A | 10/1997 | Hall et al. |
| 5,725,355 A | 3/1998 | Crall et al. |
| 5,791,879 A | 8/1998 | Fitzgerald et al. |
| 6,039,542 A | 3/2000 | Schilling et al. |
| 6,976,826 B2 | 12/2005 | Roy et al. |
| 7,052,238 B2 | 5/2006 | Whitesell et al. |
| 7,311,500 B2 | 12/2007 | Rongong et al. |
| 8,944,773 B2 * | 2/2015 | Weisse ...................... 416/229 R |
| 2008/0253885 A1 * | 10/2008 | Foose et al. ................ 415/208.2 |
| 2010/0290913 A1 | 11/2010 | Carvalho |
| 2011/0211965 A1 | 9/2011 | Deal et al. |

FOREIGN PATENT DOCUMENTS

| | | |
|---|---|---|
| GB | 2426792 | 6/2006 |
| WO | 2006086342 | 8/2006 |

OTHER PUBLICATIONS

International Search Report and Written Opinion for International Application No. PCT/US2013/042884 completed on Mar. 17, 2014.
NASA (1978). Quiet, power-lift propulsion. NASA Conference Publication 2077. Cleveland, Ohio. Nov. 14-15, 1978.
International Preliminary Report on Patentability for PCT Application No. PCT/US2013/042884, mailed Dec. 18, 2014.

* cited by examiner

*Primary Examiner* — Edward Look
*Assistant Examiner* — Cameron Corday
(74) *Attorney, Agent, or Firm* — Carlson, Gaskey, Olds, P.C.

(57) ABSTRACT

An example airfoil for a gas turbine engine includes a body having a first surface extending from a first edge to a second edge and a cavity disposed in the body. A first cover is at least partially disposed within the cavity. The first cover includes a first portion cooperates with a corresponding second portion. A second cover covers the first cover and forms at least a portion of the first surface with the body. The first cover is disposed between the body and the second cover. The first cover and the second cover have a different coefficient of thermal expansion than the body.

17 Claims, 6 Drawing Sheets

AIRFOIL COVER SYSTEM

BACKGROUND

This disclosure relates to an airfoil, for example a fan blade for a gas turbine engine.

Hybrid metal fan blades have been proposed in which a metallic sheath is secured to a composite body. However, in such an arrangement, the resultant thickness of the fan blade due to the composite body provides poor aerodynamic efficiency.

SUMMARY

An example airfoil for a gas turbine engine includes a body having a first surface extending from a first edge to a second edge and a cavity disposed in the body. A first cover is at least partially disposed within the cavity. The first cover includes a first portion cooperates with a corresponding second portion. A second cover covers the first cover and forms at least a portion of the first surface with the body. The first cover is disposed between the body and the second cover. The first cover and the second cover have a different coefficient of thermal expansion than the body.

In a further non-limiting embodiment according of the previous airfoil, wherein the cavity is spaced from the first edge and the second edge.

In a further non-limiting embodiment according to any of the previous airfoils, at least one third cover is at least partially disposed within said cavity. Each of the at least one third cover comprises a first portion coopering with a corresponding second portion. The second cover covers each of the at least one third covers.

In a further non-limiting embodiment according to any of the previous airfoils, a flexible material is disposed between the first portion and the second portion.

In a further non-limiting embodiment according to any of the previous airfoils, the first cover is secured to the body by a flexible material and the second cover is secured to the first cover by the flexible material. A flexible material is at least one of an epoxy and polyurethane.

In a further non-limiting embodiment according to any of the previous airfoils, the first cover and the second cover are one of graphite epoxy, fiberglass, or para-aramid synthetic fiber.

In a further non-limiting embodiment according to any of the previous airfoils, the first cover and the second cover are a composite material.

In a further non-limiting embodiment according to any of the previous airfoils, a flexible material is disposed in a gap between the first portion and the second portion. The gap is defined between non-linear corresponding edges of the first portion and the second portion.

In a further non-limiting embodiment according to any of the previous airfoils, the first cover includes at least one third portion cooperating with one of a corresponding first portion or corresponding second portion.

In a further non-limiting embodiment according to any of the previous airfoils, a ratio of a thickness of the first cover to a thickness the body, along a length where the first cover is adjacent the body, is between 0.1:1 and 2:1.

An example gas turbine engine includes a fan section having a plurality of fan blades. At least one of the fan blades includes a body having a suction side surface extending from a leading edge to a trailing edge and a first cover secured to the body along the suction side surface. The first cover includes a first portion cooperating with a corresponding second portion. The at least one fan blade further includes a second cover secured to the first cover and the body. The first cover is disposed between the body and the second cover. The first cover and the second cover have a different coefficient of thermal expansion than the body.

In a further non-limiting embodiment according to the previous gas turbine engine, the turbine engine includes a compressor section, a combustor in fluid communication with the compressor section, and a turbine section in fluid communication with the combustor.

In a further non-limiting embodiment according to any of the previous gas turbine engines, the compressor section includes a high pressure compressor section and a low pressure compressor section. The turbine section includes a high pressure turbine section and a low pressure turbine section. The low pressure turbine section is engaged with the low pressure compressor section via a first spool and the high pressure turbine section is engaged with the high pressure compressor section via a second spool.

In a further non-limiting embodiment according to any of the previous gas turbine engines, a first sheath secured to the leading edge. The first sheath includes a first portion cooperating with a corresponding second portion and a second sheath secured to the first sheath and the body. The first sheath is disposed between the leading edge and the second sheath. The first sheath and the second sheath have a different coefficient of thermal expansion than the body.

In a further non-limiting embodiment according to any of the previous gas turbine engines, the first cover and the second cover are a composite material.

In a further non-limiting embodiment according to any of the previous gas turbine engines, the cavity extends to at least one of the leading edge, trailing edge, a tip of the fan blade, or a root neck adjacent a root of the fan blade.

An example method of manufacturing an airfoil for a gas turbine engine includes the steps of providing a body and aligning a first portion of a first cover to be in register with a second portion of the first cover. A first flexible material is disposed between the first cover and the body. A second flexible material is disposed between a second cover and the body. A third flexible material is disposed between the second cover and the first cover. The first cover is disposed between the body and the second cover. The first cover and the second cover have a different coefficient of thermal expansion than the body.

In a further non-limiting embodiment according to the previous method, a cavity is formed in a suction side of the body. The first cover is disposed at least partially in the cavity.

In a further non-limiting embodiment according to any of the previous methods, the first cover is cut to form the first portion and second portion to define a gap having a non-linear profile.

In a further non-limiting embodiment according to any of the previous methods, a first portion of a first sheath is aligned to be in register with a second portion of the first sheath. The first sheath has a coefficient of thermal expansion different than the body. The first sheath is secured to a leading edge of the airfoil with a flexible material. A second sheath is secured to the body and the first sheath with the flexible material. The first sheath is disposed between the leading edge and the second sheath. The first sheath and the second sheath have a different coefficient of thermal expansion than the body.

Although the different examples have the specific components shown in the illustrations, embodiments of this invention are not limited to those particular combinations. It is possible to use some of the components or features from one of the examples in combination with features or components from another one of the examples.

BRIEF DESCRIPTION OF THE DRAWINGS

This disclosure can be further understood by reference to the following detailed description when considered in connection with the accompanying drawings, wherein.

DETAILED DESCRIPTION

Figure 1:
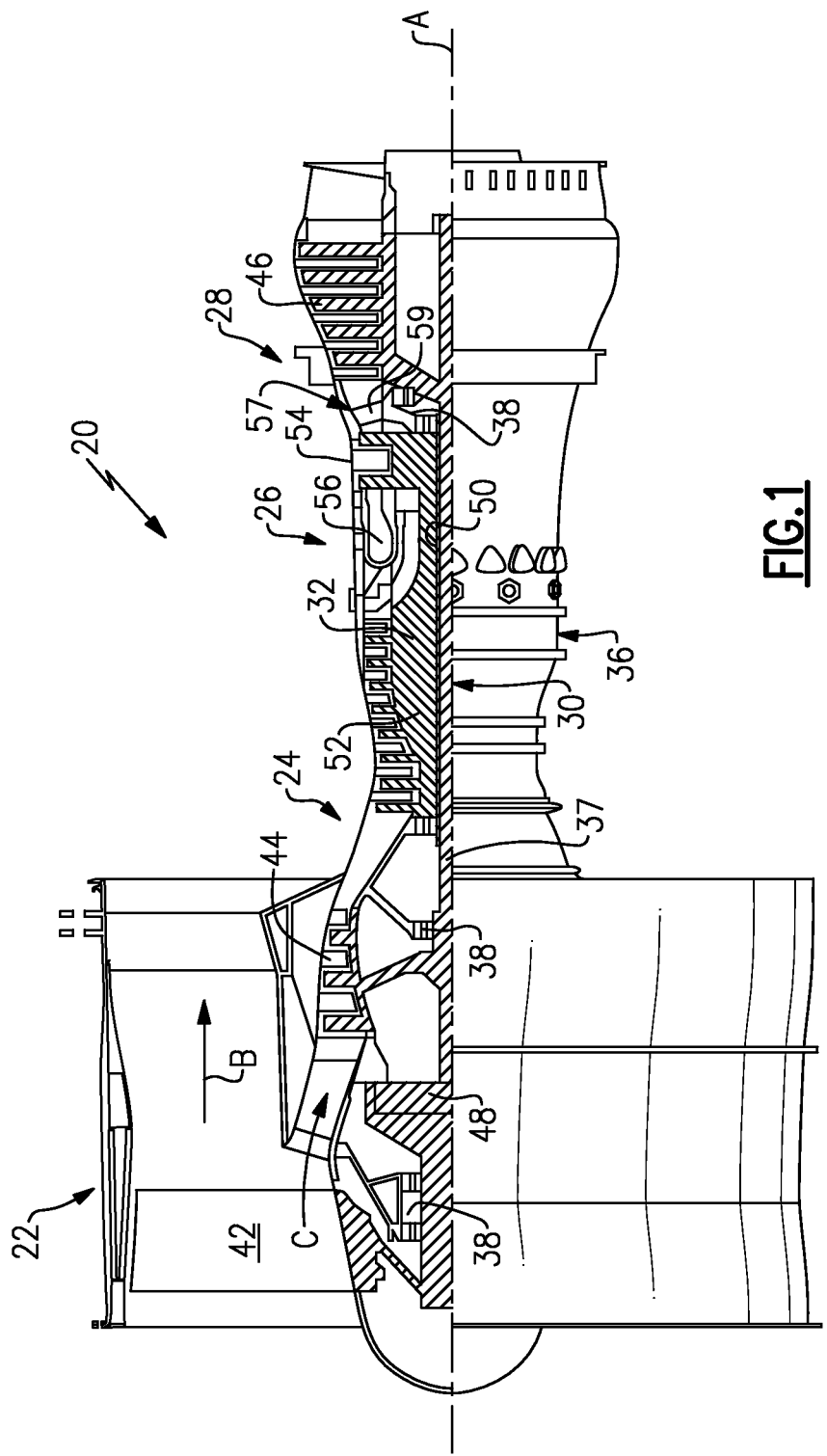
FIG. 1 is a schematic, cross sectional side view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air from the fan along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including one-spool, three-spool architectures, and non-geared turbine engines.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 37 that interconnects a fan 42, a first compressor 44 and a first turbine 46. The first shaft 37 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 37 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 feet, with the engine at an optimized fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of [(Tambient degree Rankine)/518.7)^0.5]. The "Low corrected fan tip speed" as disclosed herein according to one non-limiting embodiment is less than about 1150 feet per second.

Figure 2:
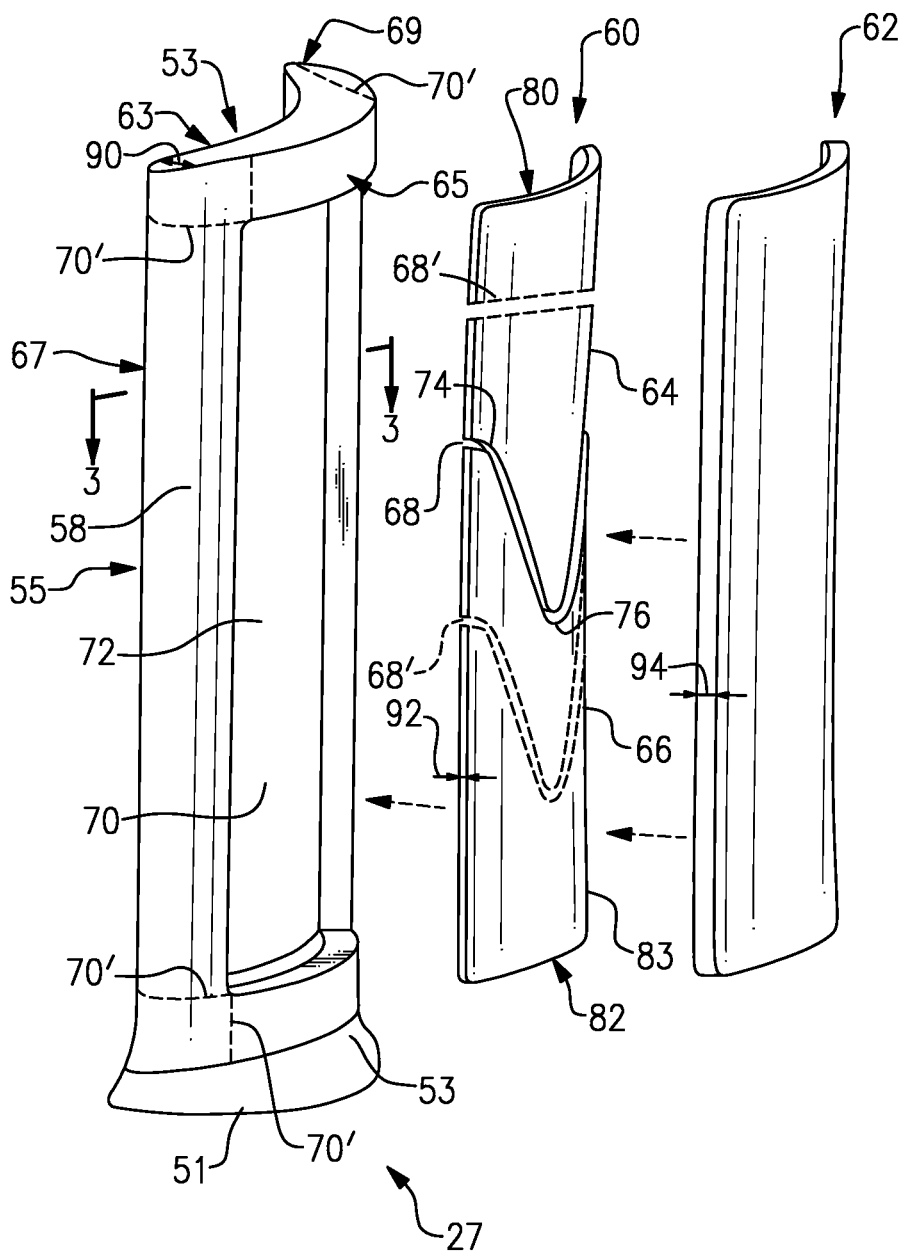
FIG. 2 is a perspective view of an example fan blade of the engine shown in FIG. 1.

Referring to FIG. 2, a fan blade 27 of the fan 42 includes a root 51 supporting a root neck 53. An airfoil 55 extends from the root neck 53 to a tip 59. The airfoil 55 includes a body 58 having spaced apart leading and trailing edges 67, 69. Pressure and suction sides 63, 65 adjoin the leading and trailing edges 67, 69.

The body 58 includes a cavity 70 between the leading and trailing edges 67, 69. In this example, the cavity 70 is disposed in the suction side 65 of the airfoil 55. However, the cavity 70 may alternatively be disposed in the pressure side 63 of the airfoil 55. The cavity 70 is sized to receive a first cover 60 and a second cover 62. The first cover 60 and second cover 62 protect ribs (not shown) of the airfoil 55. Although only one cavity 70 and corresponding first cover 60 and second cover 62 are shown, multiple cavities 70 with corresponding first cover 60 and second cover 62 may be used depending on system requirements.

The cavity 70 is spaced inwards of the leading and trailing edges 67, 69 as well as radially inwards of the root neck 53 and tip 59. However, the cavity 70 may extend to any of the tip 59, leading edge 67, trailing edge 69 and root neck 53, as shown by cavity 70', shown in phantom. The body 58 forms an inner wall 72 of the cavity 70.

In one example, each of the first cover 60 and second cover 62 are a composite material. The composite material is chosen from at least of graphite epoxy, fiberglass, or a synthetic fiber such as a para-aramid fiber. However, other composite materials may be used. In this example, the body 58 of airfoil 55 is formed of a metal material, such as titanium. Alternatively, in one example, the first cover 60 and second cover 62 may be a different material, such as a second metal having a different coefficient of thermal expansion than body 58.

The first cover 60 includes a first portion 64 and a second portion 66. The first cover 60 is cut, or otherwise formed to form a gap 68 between the first portion 64 and second portion 66. Alternatively, first portion 64 and second portion 66 can be independently formed. Gap 68 is defined between a first edge 74 of the first portion 64 and a second edge 76 of the second portion 66. In this example, the profile of the first edge 74 and second edge 76 correspond to each other such that when the first cover 60 is secured to the body 58, the first portion 64 and second portion 66 are in register and cooperating and the first edge 74 and second edge 76 are aligned. In another example, the profile of the first edge 74 and the profile of the second edge 76 are non-matching based on fan blade 27 specifications. In this example, the gap 68 has a non-linear profile and is shaped to avoid corresponding to any node lines of fan blade 27 vibration modes (not shown). In another example, the gap 68 corresponds to a rib pattern (not shown) of fan blade 27.

In one example, the gap 68 is generally centered between a tip end 80 of the first cover 60 and a root end 82 of the first cover 60. Alternatively, the gap 68 is disposed anywhere between the tip end 80 and root end 82 in response to engine specifications. Although only a single gap 68 is shown, it is within the contemplation of this disclosure for the first cover 60 to include additional gaps 68', shown in phantom, between the tip end 80 and the root end 82 forming additional third portions 83.

Figure 3A:
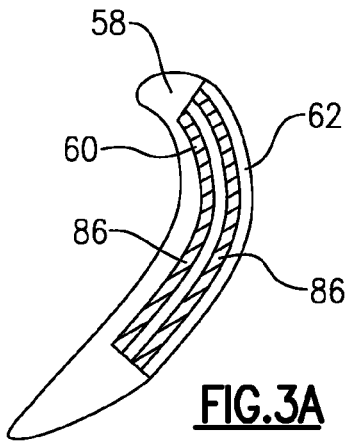
FIG. 3A is a cross sectional view of the fan blade shown in FIG. 2 taken along line 3-3.
Figure 3B:
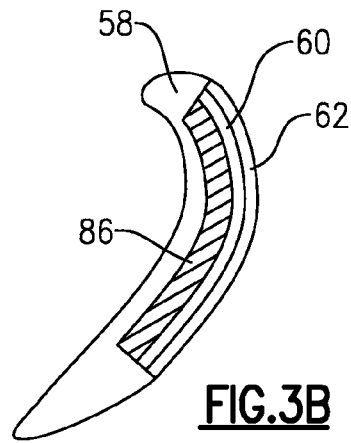
FIG. 3B is another cross sectional view of the fan blade shown in FIG. 2 taken along line 3-3.
Figure 4:
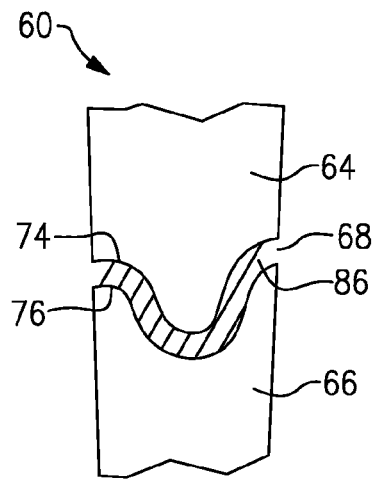
FIG. 4 is an enlarged perspective view of the first cover shown in FIG. 2 illustrating a filler provided between the first portion and the second portion of the first cover.

Referring to FIGS. 3A, 3B and 4, with continued reference to FIG. 2, a flexible material such as a filler 86 attaches the first cover 60 to the body 58 in the cavity 70 and the second cover 62 to the body 58 and first cover 60. In one example, the filler 86 is additionally used between the first portion 64 and second portion 66. However, it is within the contemplation of this disclosure to not use filler 86 between the first portion 64 and second portion 66. In one example, the filler 86 is a material such as epoxy, polyurethane, or other adhesive. The filler 86 elongates and contracts during use in response to thermal expansion and contraction between first cover and second cover 60, 62 and the body 58, as well as between first portion 64 and second portion 66 of the first cover 60.

The filler 86 is also deposited over second cover 62 and body 58 on the suction side 65 to provide an aerodynamically smooth surface in the cavity 70. The filler 86 secures the second cover 62 to the airfoil 55. The second cover 62 and body 58 form an aerodynamically smooth surface.

In another example, filler 86 secures second cover 62 to first cover 60, but not to airfoil 55. In this example, only first cover 60 is secured to the airfoil 55 by filler 86.

Airfoil 55 may also include a varying thickness 90 between the pressure side and suction side 63, 65. Similarly, the first cover 60 may include a varying thickness 92 defined in a direction between the pressure side and suction side 63, 65, and the second cover 62 may include a varying thickness 94 defined in a direction between the pressure side and suction side 63, 65. In one example, a ratio of the thickness 90 to the thickness 92 along the axial length where the first cover 60 is adjacent the body 58 is between 0.1:1 and 2:1. In another example, the ratio of the thickness 90 to the thickness 94 along the axial length where the second cover 62 is adjacent the body 58 is between 0.1:1 and 2:1. In yet another example, the ratio between the thickness 92 and the thickness 94, along the axial length where the first cover 60 is adjacent the second cover 62, is between 1:1 and 4:1.

The material of the first cover 60 and second cover 62 has a different coefficient of a thermal expansion than the material of the body 58. The filler 86 elongates or contracts during manufacture and use in response to different temperature parameters. The gap 68 reduces the stress on the filler 86 during thermal changes seen by the blade 27 during manufacture and use. The gap 68 is sized to account for differences in the thermal growth between the first materials and second materials when subject to predetermined temperatures during manufacture and use.

In one example, where at least one of the first cover and the second cover is a metal material, the ratio of the coefficient of thermal expansion of the material of the first cover 60 and the second cover 62 to the coefficient of thermal expansion of the material of the body 58 is between 2.6:1 and 1.4:1.

In one example, where at least one of the first cover and the second cover is a composite, the ratio of the coefficient of thermal expansion of the first cover 60 and the second cover 62 to the coefficient of thermal expansion of the body is 1.4:1. In another example, the coefficient of thermal expansion of the first cover 60 and the second cover 62 is smaller than the coefficient of thermal expansion of the body 58.

Figure 5:
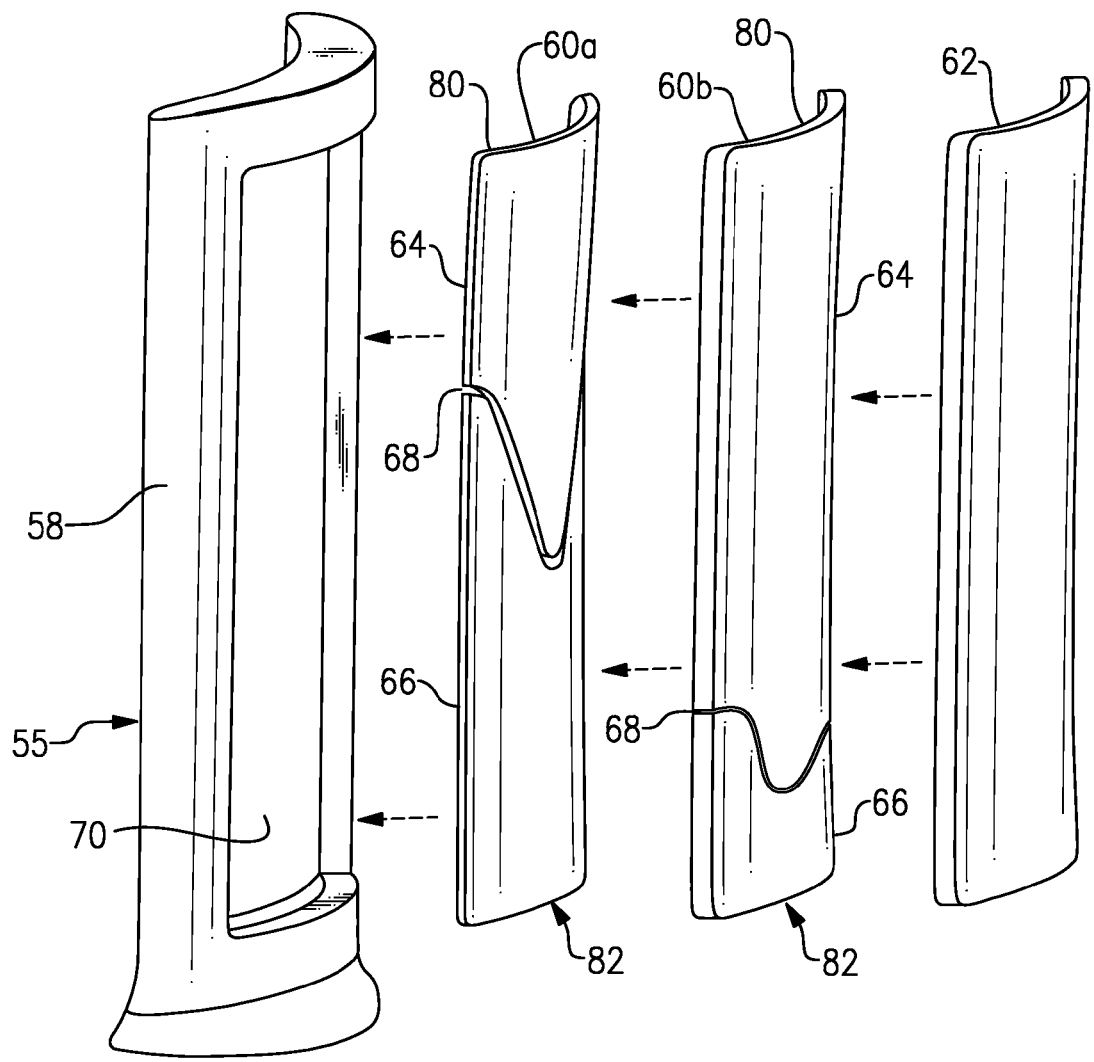
FIG. 5 is a perspective view of another example fan blade of the engine as shown in FIG. 1.

Referring to FIG. 5, in one example, a plurality of first covers 60a, 60b each include the same features as described above with regard to first cover 60 of FIGS. 2-4. Each of the first covers 60a, 60b includes gap 68 between the first portion 64 and the second portion 66. Although the plurality covers 60a, 60b have gap 68 positioned at different locations relative to the tip end 80 and root end 82, it is within the contemplation of this disclosure for the gap 68 of each of the plurality of first covers 60a, 60b to be aligned relative to the tip end 80 and root end 82.

Each of the first covers 60a, 60b is secured to the body 58 of airfoil 55 and are secured in cavity 70. The plurality of first covers 60a, 60b, and second cover 62, are in a stacked arrangement such that the filler 86 attaches the first portion 64 of each first cover 60a, 60b, to corresponding second portion 66 as well as attaching the plurality of first covers 60a, 60b and second cover 62 to each other and the body 58, as described above.

Figure 7:
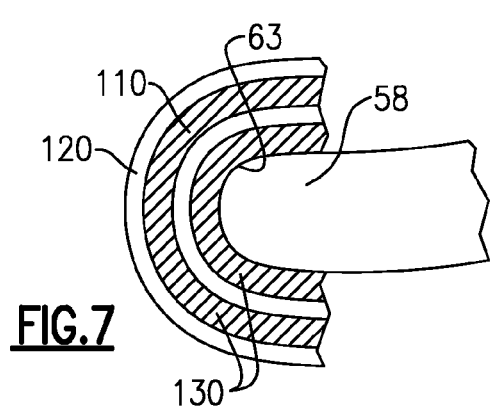
FIG. 7 is a perspective top view of the fan blade shown in FIG. 6.
Figure 8:
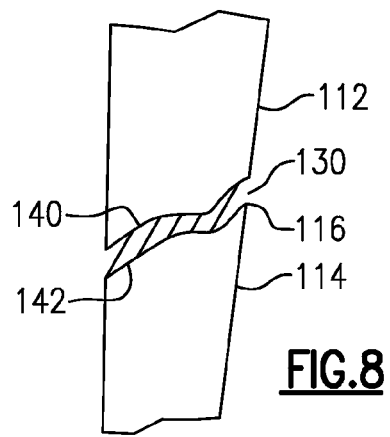
FIG. 8 is a perspective side view of the first sheath of FIG. 6, showing the filler between the first portion and second portion of the first sheath.
Figure 6:
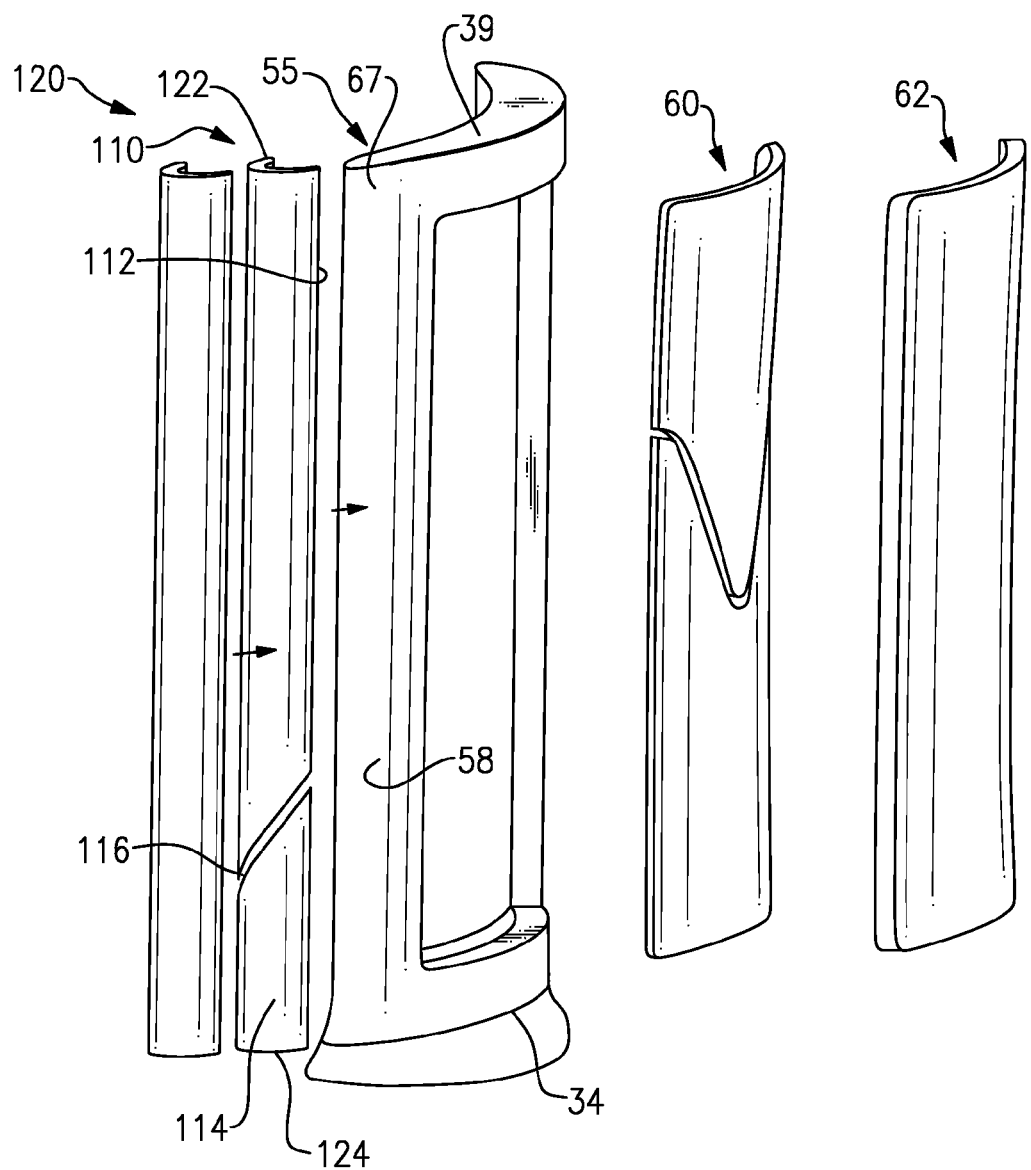
FIG. 6 is a perspective view of another example fan blade of the engine as shown in FIG. 1.

Referring to FIGS. 6-8, in addition to the first cover 60 and second cover 62 secured to the body 58 as described in any example herein, airfoil 55 includes a first sheath 110 and a second sheath 120 disposed to at least partially cover leading edge 67. The first sheath 110 includes a first portion 112 and a second portion 114. The first portion 112 and second portion 114 are spaced apart to define a gap 116. The first sheath 110 is secured to the body 58 at leading edge 67 by flexible material such as by a filler 130. In one example, the filler 130 is additionally used to secure the first portion 112 and second portion 114 of the first sheath 110. However, it is within the contemplation of this disclosure to not use filler 130 between the first portion 112 and second portion 114.

The second sheath 120 is secured by filler 130 to the body 58 and the first sheath 110 at the leading edge 67 of the airfoil 55. Gap 116 is defined between a first edge 140 of the first portion 112 and a second edge 142 of the second portion 114. The profile of the first edge 140 and the profile of the second edge 142 correspond such that when the first sheath 110 is secured to the body 58, the first portion 112 and second portion 114 are in register and cooperating and the first edge 140 and second 142 are aligned. However, it is within the contemplation of this disclosure for the profile of the first edge 140 and the profile of the second edge 142 to be non-corresponding based on fan blade 27 specifications.

The first sheath 110 and second sheath 120 can be made of a metal having a different coefficient of thermal expansion than the material of the body 58. In one example, the first sheath 110 and second sheath 120 are aluminum, nickel, or titanium, or combination thereof. Alternatively, The first sheath 110 and second sheath 120 are made of a composite material, such as graphite epoxy, fiberglass, or a synthetic fiber such as a para-aramid fiber, or combination thereof. Filler 130 is a material such as an epoxy, polyurethane, or other adhesive.

Gap 116 may be located anywhere between the tip end 122 and root end 124 of the first sheath 110. Alternatively, a plurality of gaps 116 in the first sheath 110 may be used.

The first sheath 110 and second sheath 120 may be used in combination with, or independent of any example first covers 60 and second cover 62 described herein. For example, the first cover 60 and second cover 62 may be sized to extend to the leading edge 67 and be secured such that the first cover 60 and second cover 62 abut the first sheath 110 and second sheath 120.

Figure 9:
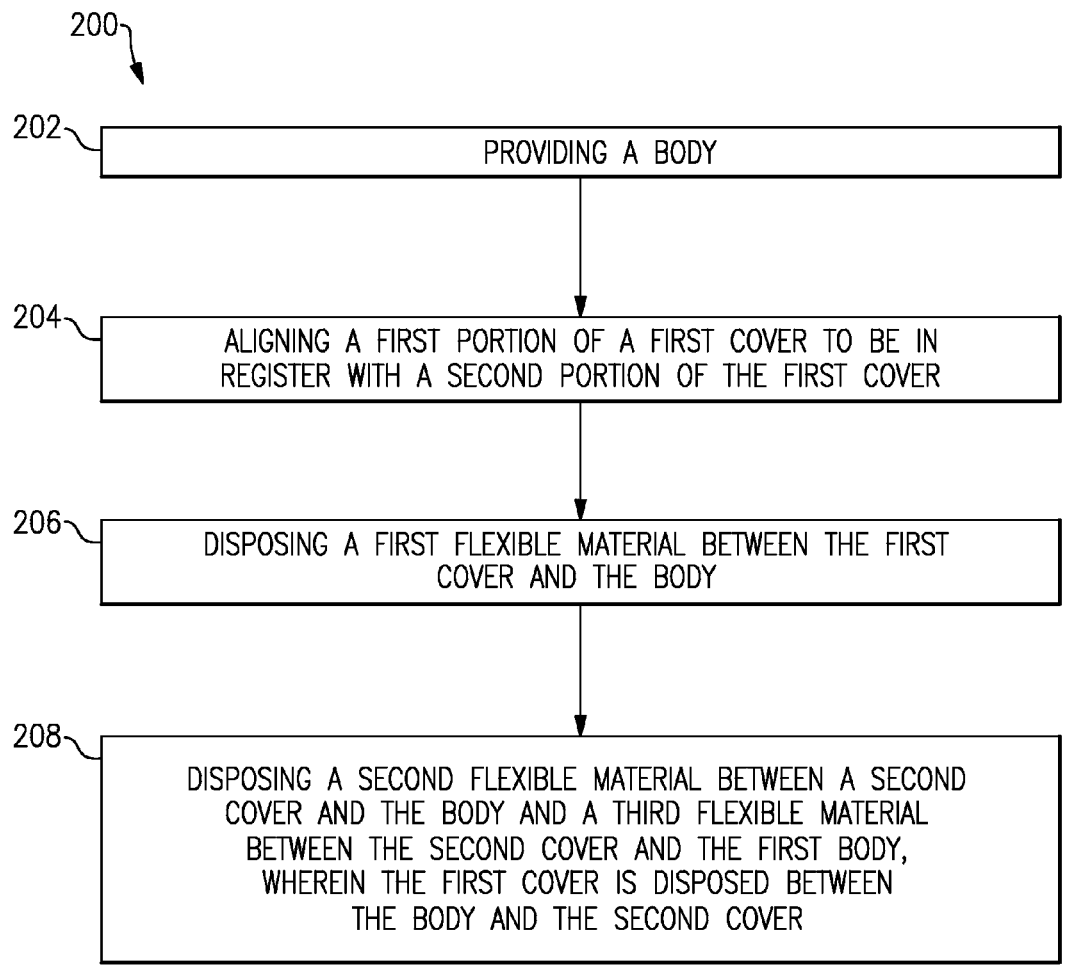
FIG. 9 is a flow chart of a method of manufacturing the fan blade of the engine shown in FIG. 1.

Referring to FIG. 9, an example method of manufacturing an airfoil 55 for a turbine engine 200 includes providing a body 202 and aligning a first portion of a first cover to be in register with a second portion of the first cover 204. A first flexible material is disposed between the first cover and the body 206. A second flexible material is disposed between a second cover and the body, and a third flexible material is disposed between the second cover and the first composite cover 208. The first composite cover is disposed between the body and the second cover 208. In one example, the first cover and second cover are materials. However, other materials may be used.

In use, utilization of the gap 68 separating first portion 64 and second portion 66 of the first cover 60 and gap 116 separating first portion 112 and second portion 114 of the first sheath 110 provides greater adaptation to differences in thermal growth between metal materials and composite materials over a predetermined temperature range that occur during manufacture and use, to reducing stress on filler 86. The fan blade 27 of the present disclosure may utilize both metal and composite materials, as described in this disclosure, to reduce stress on any of the first cover 60, second cover 62, first sheath 110, second sheath 120, and associated fillers 86, 130, respectively, which occur due to different coefficients of thermal expansion between the materials of the first cover 60 and second cover 62 as well as the first sheath 110 and second sheath 120, respectively.

In one example, the characteristics of the composite materials, including the placement thereof in or upon the airfoil 55, such as first cover 60 and second cover 62, may be determined based upon a pre-determined environmental factor, such as foreign object strike incidence or temperature. These characteristics may include thickness, shape, size, profile, and placement of the first cover 60, second cover 62.

Although an example embodiment has disclosed, a worker of ordinary skill in the art would recognize that certain modifications would come within the scope of the claims. For example, any feature of the various examples described above may be used with any other feature of a different example. For that reason, the following claims should be studied to determine their true scope and content.

What is claimed is:

1. An airfoil for a gas turbine engine comprising:
a body having a first surface extending from a first edge to a second edge;
a cavity disposed in the body;
a first cover at least partially disposed within the cavity, the first cover comprising a first portion cooperating with a corresponding second portion;
a second cover covering said first cover and forming at least a portion of the first surface with said body, wherein the first cover is disposed between the body and the second cover, wherein the first cover and the second cover have a different coefficient of thermal expansion than the body; and
wherein a flexible material is disposed in a gap between the first portion and the second portion, the gap defined between corresponding edges of the first portion and the second portion.

2. The airfoil of claim 1, wherein the cavity is spaced from the first edge and the second edge.

3. The airfoil of claim 1, wherein a flexible material is disposed between the first portion and the second portion.

4. The airfoil of claim 1, wherein the first cover is secured to the body by a flexible material and the second cover is secured to the first cover by the flexible material, wherein a flexible material is at least one of an epoxy and polyurethane.

5. The airfoil of claim 1, wherein the first cover and the second cover are one of graphite epoxy, fiberglass, or para-aramid synthetic fiber.

6. The airfoil of claim 1, wherein the first cover and the second cover are a composite material.

7. The airfoil of claim 1, wherein the first cover includes at least one third portion cooperating with one of a corresponding first portion or a corresponding second portion.

8. The airfoil of claim 1, wherein a ratio of a thickness of the first cover to a thickness of the body, along a length where the first cover is adjacent the body, is between 0.1:1 and 2:1.

9. An airfoil for a gas turbine engine comprising:
a body having a first surface extending from a first edge to a second edge;
a cavity disposed in the body;
a first cover at least partially disposed within the cavity, the first cover comprising a first portion cooperating with a corresponding second portion;
a second cover covering said first cover and forming at least a portion of the first surface with said body, wherein the first cover is disposed between the body and the second cover, wherein the first cover and the second cover have a different coefficient of thermal expansion than the body; and
at least one third cover having a different coefficient of thermal expansion than the body and at least partially disposed within said cavity, each of the at least one third cover comprising a first portion cooperating with a corresponding second portion, wherein the second cover covers each of the at least one third covers.

10. A gas turbine engine comprising:
a fan section comprising a plurality of fan blades, at least one of said fan blades comprising:
a body having a suction side surface extending from a leading edge to a trailing edge;
a first cover secured to the body along the suction side surface, the first cover comprising a first portion cooperating with a corresponding second portion;

a second cover secured to the first cover and the body, wherein the first cover is disposed between the body and the second cover;

a first sheath secured to the leading edge, the first sheath comprising a first portion cooperating with a corresponding second portion; and a second sheath secured to the first sheath and the body, wherein the first sheath is disposed between the leading edge and the second sheath, wherein the first sheath and the second sheath have a different coefficient of thermal expansion than the body.

11. The turbine engine of claim 10, further comprising:
a compressor section;
a combustor in fluid communication with the compressor section; and
a turbine section in fluid communication with the combustor.

12. The turbine engine of claim 11, wherein the compressor section includes a high pressure compressor section and a low pressure compressor section, wherein the turbine section includes a high pressure turbine section and a low pressure turbine section, wherein and the low pressure turbine section is engaged with the low pressure compressor section via a first spool and the high pressure turbine section is engaged with the high pressure compressor section via a second spool.

13. The turbine engine of claim 10, wherein the first cover and the second cover are a composite material.

14. The turbine engine of claim 13, wherein a cavity extends to at least one of the leading edge, trailing edge, a tip of the fan blade, or a root neck adjacent a root of the fan blade.

15. A method of manufacturing an airfoil for a gas turbine engine, comprising the steps of:
providing a body;
aligning a first portion of a first cover to be in register with a second portion of the first cover;
disposing a first flexible material between the first cover and the body;
disposing a second flexible material between a second cover and the body;
disposing a third flexible material between the second cover and the first cover, wherein the first cover is disposed between the body and the second cover, wherein the first cover and the second cover have a different coefficient of thermal expansion than the body; and
cutting the first cover to form the first portion and second portion to define a gap having a non-linear profile.

16. The method of claim 15, further including the step of forming a cavity in a suction side of the body, wherein the first cover is disposed at least partially in the cavity.

17. A method of manufacturing an airfoil for a gas turbine engine, comprising the steps of:
providing a body;
aligning a first portion of a first cover to be in register with a second portion of the first cover;
disposing a first flexible material between the first cover and the body;
disposing a second flexible material between a second cover and the body;
disposing a third flexible material between the second cover and the first cover, wherein the first cover is disposed between the body and the second cover, wherein the first cover and the second cover have a different coefficient of thermal expansion than the body;
aligning a first portion of a first sheath to be in register with a second portion of the first sheath, wherein the first sheath has a coefficient of thermal expansion different than the body;
securing the first sheath to a leading edge of the airfoil with a flexible material; and
securing a second sheath to the body and the first sheath with the flexible material, wherein the first sheath is disposed between the leading edge and the second sheath, wherein the first sheath and the second sheath have a different coefficient of thermal expansion than the body.

* * * * *